Figure 7:
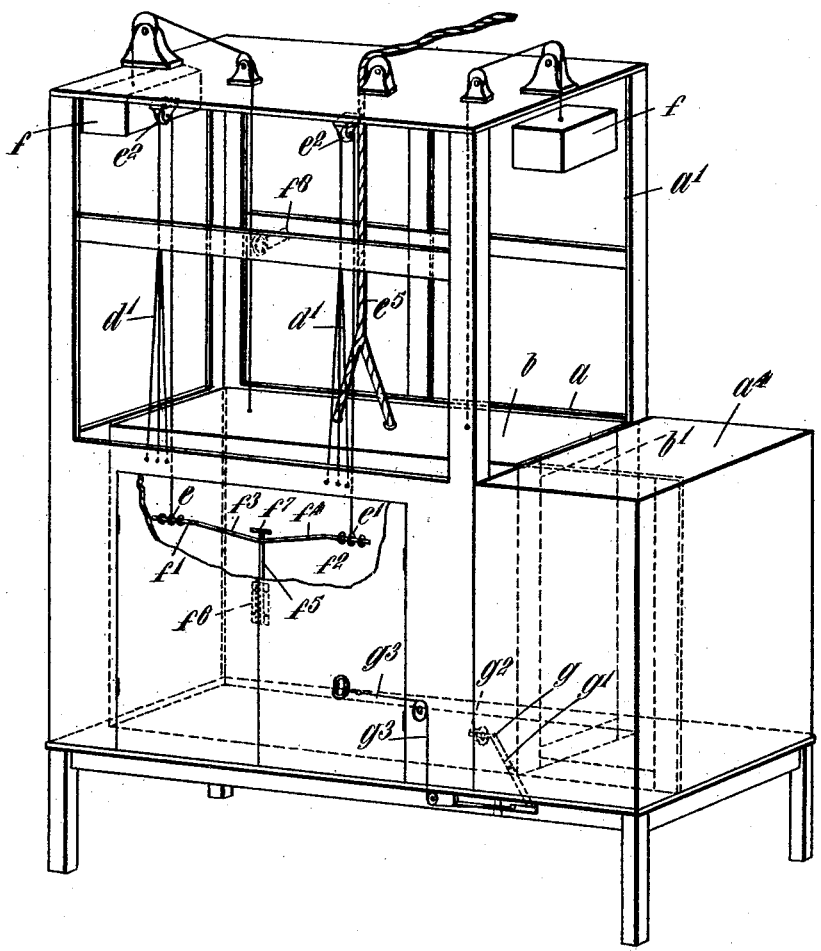

H. GOLDIN.
THEATRICAL ILLUSION APPARATUS.
APPLICATION FILED MAY 21, 1913.
1,116,882.
Patented Nov. 10, 1914.
3 SHEETS—SHEET 1.
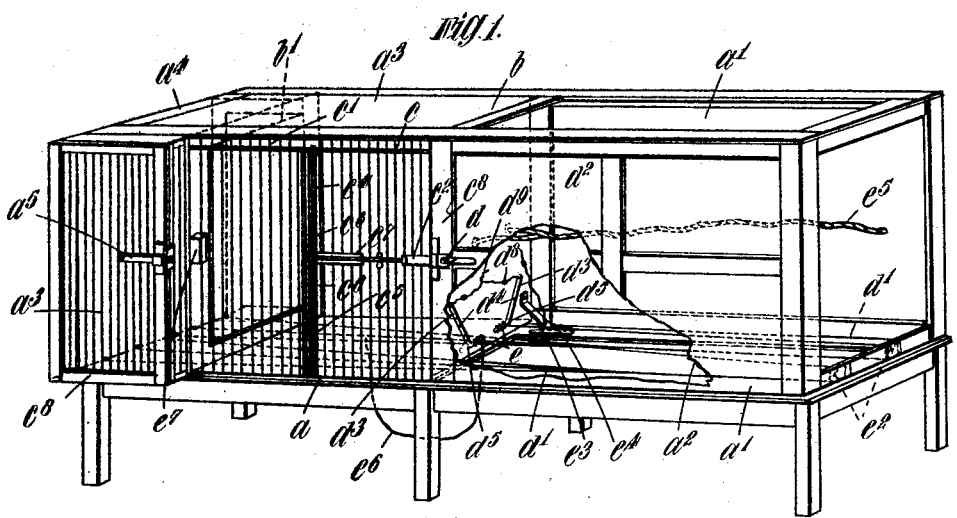
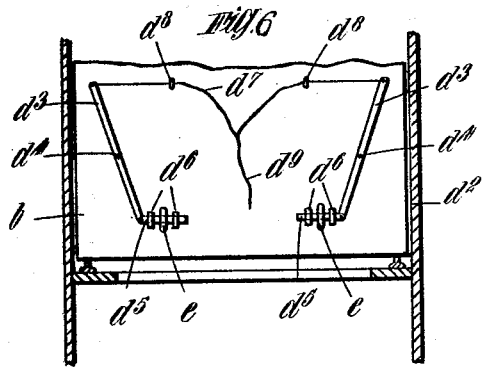

H. GOLDIN.
THEATRICAL ILLUSION APPARATUS.
APPLICATION FILED MAY 21, 1913.
1,116,882.
Patented Nov. 10, 1914.
3 SHEETS—SHEET 2.
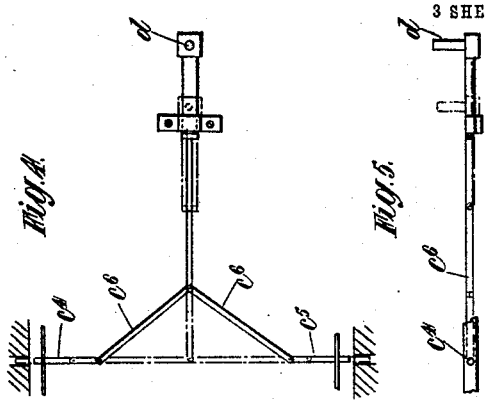
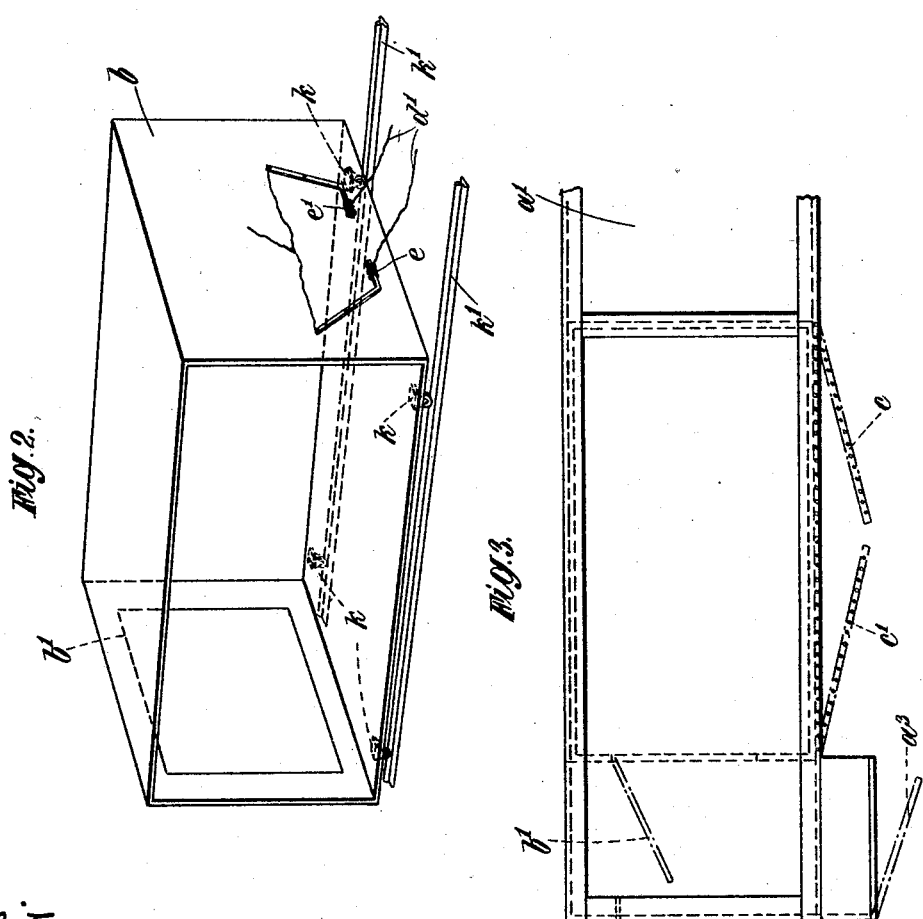

H. GOLDIN.
THEATRICAL ILLUSION APPARATUS.
APPLICATION FILED MAY 21, 1913.

1,116,882.

Patented Nov. 10, 1914.

3 SHEETS—SHEET 3.

UNITED STATES PATENT OFFICE.

HORACE GOLDIN, OF MARYLEBONE, LONDON, ENGLAND.

THEATRICAL ILLUSION APPARATUS.

1,116,882. Specification of Letters Patent. Patented Nov. 10, 1914.

Application filed May 21, 1913. Serial No. 768,944.

*To all whom it may concern:*

Be it known that I, HORACE GOLDIN, a subject of the King of Great Britain, residing at 7 Portland Court, Great Portland street, Marylebone, in the county of London, England, have invented certain new and useful Improvements in or Relating to Theatrical Illusion Apparatus, of which the following is a specification.

This invention relates to improvements in theatrical illusion apparatus adapted to represent the act of placing a person or persons with a tiger or other beast of prey in a cage or similar structure.

According to this invention the apparatus comprises an outer and an inner cage, the former of which is provided with a masked or obscured extension so that the inner cage, which contains the tiger or other beast and which normally registers with the outer cage, may be moved into the masked or obscured extension of said outer cage. The extension may be arranged horizontally or vertically and is such that the inner cage may be rapidly moved into or out of the same to effect the desired illusion. The front of the main compartment of the cage is provided with doors which are automatically unlocked when the inner cage is moved into the extension provided on the outer cage. Means are provided for imparting a rapid initial movement to the inner cage toward the extension of the outer cage and the arrangement is such that as the cage approaches the end of its travel it is automatically retarded and rendered in condition for being freely moved back to its normal position within the outer cage. A locking device is provided to retain the inner cage in this last mentioned position, and the cage cannot be moved until this device is released.

In order that the said invention may be clearly understood and readily carried into effect I will proceed to describe the same more fully with reference to the accompanying drawing, in which:—

Figure 1 is a perspective view of the improved apparatus provided with a horizontal extension. Fig. 2 is a perspective view of the inner cage. Fig. 3 is a plan of the left hand portion of Fig. 1. Figs. 4 and 5 are, respectively, an elevation and a plan of the locking device for the swinging doors of the outer cage. Fig. 6 is a detail view of the means for releasing the elastic bands actuating the inner cage. Fig. 7 is a perspective view of a modified form of the apparatus which is provided with a vertically arranged extension.

Referring particularly to the arrangement illustrated in Fig. 1, of the drawing, $a$ is the outer cage which is provided with a masked or obscured extension $a'$, the front of which is closed by a paneled member $a^2$. The cage $a$ is of such dimensions as to contain the inner cage $b$ and is provided with swinging front doors or grids $c$, $c'$ which are adapted to be operated to place the interior of the cage in communication with the exterior thereof. One end of the front portion of the cage is provided with a swinging door or grating $a^3$ which allows of entrance being had to a space $a^4$ formed between the ends of the inner and outer cages when the former member is in its normal position. A locking device $a^5$ is provided on the door $a^3$ and said device is operated from the exterior of the cage when it is desired to enter the space $a^4$. The swinging doors $c$, $c'$ are provided with a locking device $c^2$ which is adapted to be automatically released when the inner cage $b$ is moved from the interior of the cage $a$ into the extension $a'$ as will be hereinafter described. The locking device $c^2$ comprises a pair of bolts $c^4$, $c^5$ which are connected by means of toggle links $c^6$ with a rod $c^7$ which is mounted on the framework $c^8$ of the outer cage so as to be capable of movement in an axial direction. A pin $d$ is provided on the rod $c^7$ and it is arranged transversely to the axis of said rod, so as to project into the path of movement of the inner cage $b$.

The inner cage $b$ is mounted within the outer cage $a$ so as to be capable of ready movement toward the extension $a'$ and for this purpose is provided with suitable rollers or wheels $k$ which are adapted to engage with rails $k'$ arranged on the floor of the outer cage. The cage $b$ has no front and this portion of the cage is always obstructed by the swinging doors $c$, $c'$ of the outer cage or the member $a^2$ of the extension $a'$, this member concealing the cage $b$ from view from the front when the cage $b$ is behind it, this member being, for identification, called the paneled member. The end $b'$ of the cage $b$ remote from the extension $a'$ is hinged to the body of the cage and is adapted to be swung open as shown in broken lines, when the inner cage is in its normal position so as to give the tiger therein free access to the end portion $a^4$ of the outer cage. It will of course be understood that this door is closed before the inner cage is moved into the extension $a'$, and suitable means are provided for retaining the door in the closed position.

Motion is imparted to the cage $b$ toward the extension $a'$ of the outer cage by means of bands $d'$ of rubber or other elastic material or by suspended weights. These bands $d'$ are connected at one end to the framework $c^8$ of the outer cage and at the other end to the wall $d^2$ of the inner cage nearest the extension $a'$. The wall $d^2$ of the inner cage is provided with a pair of levers $d^3$, Fig. 6, which are pivoted at $d^4$ to the said wall and which have their lower ends connected to two sliding rods $d^5$. These latter members are freely mounted in guides $d^6$ so as to be capable of a sliding movement when the levers $d^3$ are turned about their pivots; this latter operation is effected by means of a rope or other flexible member $d^7$ which is connected to the ends of the levers $d^3$ remote from the sliding rods $d^5$. $d^8$ are eyes mounted on the end $d^2$ of the inner cage and the rope $d^7$ passes through the same. The levers $d^3$ are normally retained by springs or similar devices in the position shown in the drawing but when the end $d^9$ of the rope $d^7$ is pulled the two levers are turned about their pivots and the two rods $d^5$ displaced. The ends of the rubber bands $d'$ which are connected to the inner cage are secured to two rings $e$, $e'$, which are threaded over the sliding rods $d^5$. When said rods are in their normal position the rings $e$, $e'$ are securely held, but when they are displaced in the manner above described said rings will be liberated and the bands $d'$ disconnected with the inner cage. The bands $d'$ pass over pulleys or rollers $e^2$ arranged at the end of the extension $a'$ and when the inner cage is situated within the outer cage said bands are under considerable tension. In order to retain the cage $b$ in this position a safety catch $e^3$ is provided thereon and this member is adapted to engage with a rack or teeth $e^4$ carried by the outer cage. When it is desired to move the inner cage $b$ into the extension $a'$ the catch $e^3$ is released from the teeth $e^4$ and the bands $d'$ rendered operative. The cage will be rapidly moved by said bands and if desired the movement of the cage may be assisted by a number of attendants pulling on a rope $e^5$ secured to the end of the cage. In order to retard the movement of the cage when it is approaching the end of the extension $a'$ an elastic band or bands $e^6$ is or are connected to the same, the arrangement being such that the tension on said bands $e^6$ is sufficient to effect the retardation of the cage and bring the same to rest in the desired position.

When the inner cage has reached the end of its travel the levers $d^3$ are operated and the bands $d'$ disconnected so as to permit of the cage being readily returned to its initial position. The end of the cage $b$ remote from the extension $a'$ is provided with a block or projection $e^7$ which, when the cage is displaced, is adapted to engage with the transverse pin $d$ of the locking device $c^2$ and thereby release the swinging doors $c$, $c'$ of the outer cage. The locking device may be provided with suitable springs which serve to retain the rod $c^7$ thereof in the locking position so that when the inner cage is moved in the opposite direction said springs will come into operation to lock the swinging doors of the outer cage.

The mode of effecting the illusion is as follows: The inner cage $b$ containing the tiger or other beast is situated within the outer cage $a$ as shown in the drawing, and the door $b'$ is open as shown in broken lines so that the tiger has free access to the whole of the interior of the outer cage. The door $b'$ is then closed and the door $a^3$ is opened to admit the person or persons into the space $a^4$ between the ends of the cages. At the same time the safety catch $e^3$ is operated and the inner cage released so that it will be drawn rapidly into the masked extension $a'$ out of sight of the audience. As the inner cage recedes the person or persons in the space $a^4$ will follow it up and enter the space it initially occupied. These movements are effected so rapidly that the audience appear to witness the feeding of the person or persons to the tiger or other beast of prey. When the inner cage reaches the end of its travel the doors $c$, $c'$ of the outer cage are automatically opened disclosing the person or persons as occupying the space which originally contained the tiger.

In the arrangement illustrated in Fig. 7 of the drawings the extension $a'$ of the outer cage $a$ is situated above the same and the inner cage $b$ is adapted to be displaced in a vertical direction. As in the previous arrangement the movement of the inner cage is effected through the intervention of bands $d'$ of rubber or other elastic material. In order to facilitate the lifting of the inner cage it is provided with counterbalance weights $f$. The operating bands $d'$ are adapted to be released automatically when the inner cage reaches the end of its travel. This is effected by mounting the rings $e$, $e'$ at the ends of said bands on two sliding rods $f'$, $f^2$ carried by the inner cage. These rods $f'$, $f^2$ are connected by toggle links $f^3$, $f^4$ with a rod $f^5$ which is adapted to move in a guide $f^6$. The upper end of the rod $f^5$ is provided with a head $f^7$ which, when the cage is displaced into the extension $a'$ will come into contact with a pin $f^8$ on said extension. The rod $f^5$ will thus be depressed and through the intervention of the links $f^3$, $f^4$ will impart a sliding movement to the rods $f'$, $f^2$ and release the rings $e$, $e'$ connecting the bands $d'$ to the inner cage.

A similar method to that employed in the last mentioned arrangement may be provided for retarding the movement of the inner cage. The latter is retained in its normal position by means of a safety device $g$ which comprises a spring controlled lever $g'$ which is adapted to shoot a bolt or the like $g^2$ into engagement with the cage $b$. One end of said lever may be connected to a rope or wire $g^3$ and when this latter is pulled the inner cage will be released.

The front doors of the cage may be automatically unlocked in the manner previously described so that when the inner cage is raised into the extension $a'$ said doors will be opened.

The movements of the inner cage may be obscured by discharging a volume or cloud of steam, smoke or other medium before the front of the outer cage. This may be effected by arranging a number of jets along the front of the outer cage so as to distribute the steam or the like which is supplied thereto from a boiler or other suitable apparatus. A small volume of steam or smoke may be continuously distributed while an incantation is being performed by one of the actors but when the inner cage is moved the volume of steam or smoke discharged by the jets is considerably increased so as to cover the movements thereof.

What I claim and desire to secure by Letters Patent of the United States is:—

1. In an illusion apparatus, the combination of a main outer cage, a masked extension on said outer cage in line with the frontage thereof, an inner cage and means for moving the inner cage into and out of the masked extension of the outer cage.

2. In an illusion apparatus, the combination of a main outer cage, a masked extension on said outer cage in line with the frontage thereof, an inner cage normally registering with the outer cage and means for rapidly moving the inner cage into the masked extension of the outer cage.

3. In an illusion apparatus, the combination of a main outer cage, a masked extension on said outer cage in line with the frontage thereof, an inner cage normally registering with the outer cage, a safety catch for retaining the inner cage in this position and means for rapidly moving the inner cage into the masked extension when said safety catch is released.

4. In an illusion apparatus, the combination of a main outer cage, a masked extension on said outer cage in line with the frontage thereof, swinging doors on the front of said outer cage, an inner cage normally registering with the outer cage, a safety catch for retaining the inner cage in this position, means for rapidly moving the inner cage into the masked extension, and means for retarding the movement of said cage when it approaches the end of its travel.

5. In an illusion apparatus, the combination of a main outer cage, a masked extension on said outer cage, swinging doors on the front of said outer cage, an inner cage normally registering with the outer cage, a safety catch for retaining the inner cage in this position, a plurality of elastic bands for rapidly moving the inner cage into the masked extension and a plurality of elastic bands for retarding the movement of said cage when it approaches the end of its travel.

6. In an illusion apparatus, the combination of a main outer cage, a masked extension thereon, swinging doors on the front of said outer cage, an inner cage normally registering with the outer cage, a safety catch for retaining the inner cage in this position, a plurality of elastic bands for rapidly moving the inner cage into the masked extension, means for disconnecting said elastic bands from the inner cage and a plurality of elastic bands for retarding the movement of said cage, when it approaches the end of its travel.

7. In an illusion apparatus, the combination of a main outer cage, a masked extension thereon, swinging doors on the front of said outer cage, an inner cage normally registering with the outer cage, a safety catch for retaining the inner cage in this position, a plurality of sliding rods on said inner cage, rings on said rods, elastic bands secured to said rings and adapted to rapidly move the inner cage into the masked extension, mechanism for actuating said sliding rods to disconnect said elastic bands from the inner cage and a plurality of elastic bands for retarding the movement of said cage when it approaches the end of its travel.

8. In an illusion apparatus, the combination of a main outer cage, a masked extension thereon, swinging doors on the front of said outer cage, a locking device for said swinging doors, an inner cage normally registering with the outer cage, a safety catch for retaining the inner cage in this position, a plurality of sliding rods on said inner cage, rings on said rods, elastic bands secured to said rings and adapted to rapidly move the inner cage into the masked extension, mechanism for actuating said sliding rods to disconnect the elastic bands from the inner cage, and a plurality of elastic bands for retarding the movement of said cage when it approaches the end of its travel.

9. In an illusion apparatus, the combination of a main outer cage, a masked extension thereon, swinging doors on the front of said outer cage, a locking device for said swinging doors, an inner cage normally registering with the outer cage, a safety catch for retaining the inner cage in this position, a plurality of sliding rods on said inner cage, rings on said rods, elastic bands secured to said rings and adapted to rapidly move the inner cage into the masked extension, mechanism for actuating said sliding rods to disconnect said elastic bands from the inner cage, mechanism for automatically unlocking the swinging doors on the outer cage when the inner cage has been moved into the masked extension, and a plurality of elastic bands for retarding the movement of said cage when it approaches the end of its travel.

10. In an illusion apparatus the combination of a main outer cage, a masked extension thereon, swinging doors on the front of said outer cage, a locking device for said swinging doors, an inner cage registering with the outer cage, a hinged end wall on said inner cage, a safety catch for retaining the inner cage in position, a plurality of sliding rods on said inner cage, rings on said rods, elastic bands secured to said rings and adapted to rapidly move the inner cage into the masked extension, mechanism for actuating said sliding rods to disconnect said elastic bands from the inner cage, mechanism for automatically unlocking the swinging doors on the outer cage when the inner cage has been moved into the masked extension, and a plurality of elastic bands for retarding the movement of said cage when it approaches the end of its travel.

In testimony whereof I affix my signature in presence of two witnesses.

HORACE GOLDIN.

Witnesses:
EUSTACE H. BARKER,
ARTHUR T. WAGHOW.

Copies of this patent may be obtained for five cents each, by addressing the "Commissioner of Patents, Washington, D. C."